United States Patent [19]
Sugaya et al.

[11] Patent Number: 5,398,225
[45] Date of Patent: Mar. 14, 1995

[54] OPTICAL INFORMATION RECORDING/REGENERATING APPARATUS AND TRACK SCANNING METHOD FOR AN OPTICAL INFORMATION RECORDING/REGENERATING APPARATUS

[75] Inventors: Takumi Sugaya, Hachioji; Takao Rokutan, Higashimurayama; Mitsuo Oshiba, Hachioji; Takefumi Sakurada, Akishima; Naoaki Tani, Hachioji, all of Japan

[73] Assignee: Olympus Optical Co., Ltd., Tokyo, Japan

[21] Appl. No.: 103,101

[22] Filed: Aug. 9, 1993

[30] Foreign Application Priority Data

Sep. 7, 1992 [JP] Japan .................................. 4-238408

[51] Int. Cl.⁶ .............................................. G11B 7/00
[52] U.S. Cl. ........................................ 369/48; 369/32; 369/50; 369/54; 369/95; 369/124; 235/456
[58] Field of Search ............... 369/32, 44.28, 47–48, 369/50, 53, 54, 94–95, 111, 124; 235/454, 456

[56] References Cited

U.S. PATENT DOCUMENTS 5,155,718 10/1992 Hashimoto et al. ............. 369/44.32
5,233,584 8/1993 Kulakowski et al. ............. 369/54 X

FOREIGN PATENT DOCUMENTS 2-141932 5/1990 Japan .

*Primary Examiner*—W. R. Young
*Attorney, Agent, or Firm*—Armstrong, Westerman, Hattori, McLeland, & Naughton

[57] ABSTRACT

An optical information recording/regenerating apparatus includes an optical head for irradiating a regeneration light spot to a plurality of tracks on an optical recording medium simultaneously via an objective optical system. A regenerating arrangement is provided for simultaneously scanning the plurality of tracks to which the optical head has irradiated the regeneration light spot, and then reading recorded information from the plurality of tracks. An error-correcting arrangement is provided which receives the recorded information read by the regenerating arrangement for performing error correction using the error-correcting codes for the plurality of tracks. An error-correction result memory arrangement is provided for storing results that indicate whether or not the error-correcting arrangement succeeded in error correction. A control arrangement is responsive to results stored in the error-correction result memory which indicate that error correction has not succeeded for the information regenerated from at least one track among the information regenerated from the plurality of simultaneously-scanned tracks. A driving device drives the regeneration light spot and the optical recording medium relatively to each other. The control arrangement controls the drive device so that the track for which the error correction has not succeeded will be included in a scanning range.

14 Claims, 6 Drawing Sheets

ACCESS METHOD FOR SIMULTANEOUS REGENERATION OF MULTIPLE TRACKS

DIRECTION OF MOVEMENT
OF AN OPTICAL CARD

DIRECTION OF MOVEMENT
OF AN OPTICAL CARD

FIG.7(a) TRACK JUMP PULSE

FIG.7(b) TRACKING ERROR SIGNAL

FIG.7(c) SW CONTROL SIGNAL

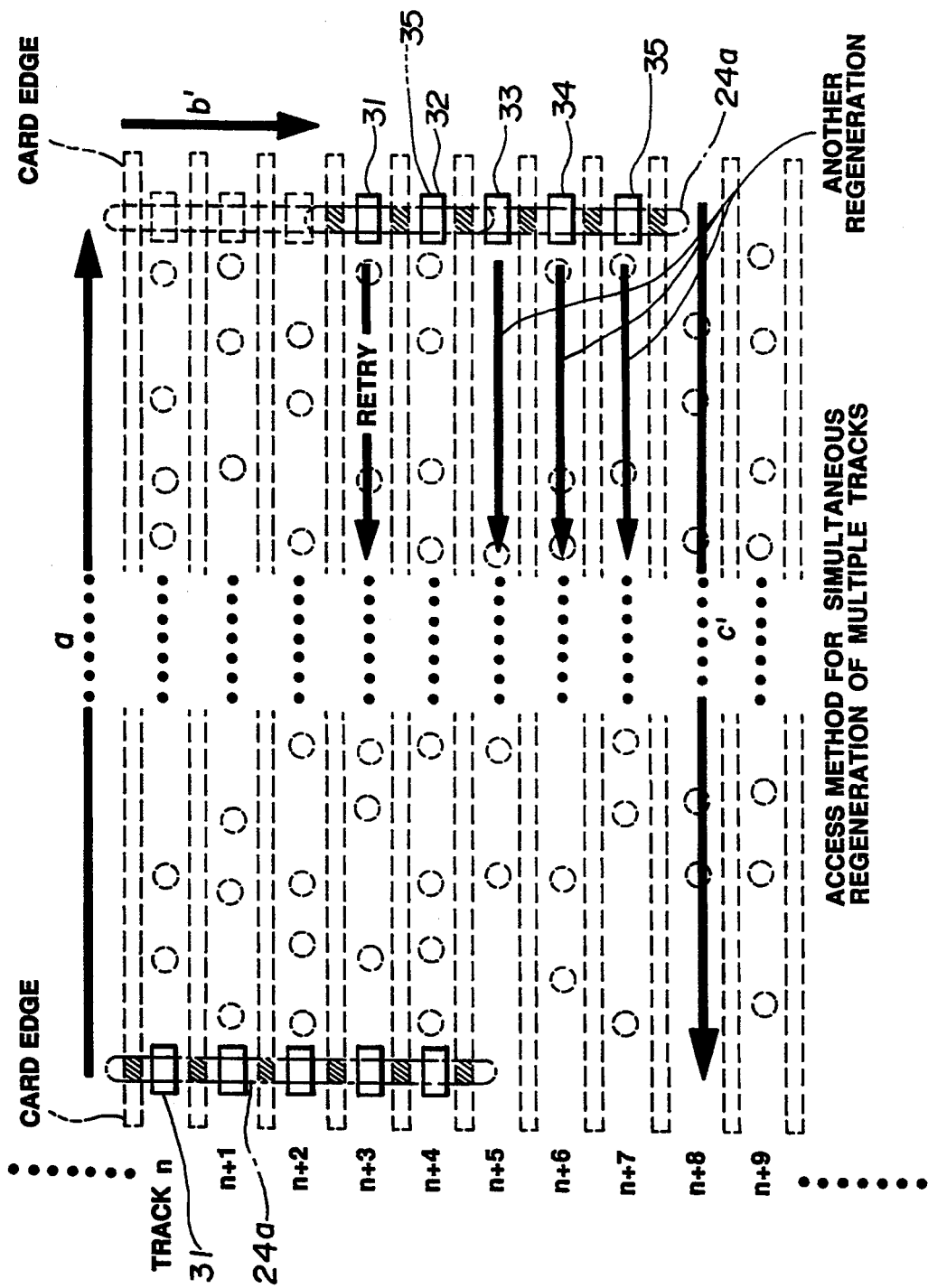

OPTICAL INFORMATION RECORDING/REGENERATING APPARATUS AND TRACK SCANNING METHOD FOR AN OPTICAL INFORMATION RECORDING/REGENERATING APPARATUS

BACKGROUND OF THE INVENTION

1. Field of the Invention

The present invention relates to an optical information recording/regenerating apparatus of a multi-track regeneration type and a track scanning method for an optical information recording/regenerating apparatus that can scan and regenerate multiple tracks on an optical recording medium such as an optical card simultaneously.

2. Description of the Related Art

Multiple parallel tracks having inherent addresses are running on an optical recording medium such as an optical card.

In an optical information recording/regenerating apparatus, information recording or regenerating is achieved by reciprocating an optical recording medium and an optical head relatively to each other in a direction parallel or perpendicular to tracks. For recording information on an optical recording medium, an error-correcting code is appended to information to be recorded, and the information is recorded as a pit in a track using a modulated optical beam. For regenerating recorded information, a regeneration light spot is irradiated to a track to be regenerated, the presence or absence of a pit is detected depending on the intensity of reflected light, and then demodulation and error correction are performed. Finally, the recorded information is regenerated. If error correction fails, retry is performed in general.

In this kind of optical information recording/regenerating apparatus of a single-track regeneration type, an executable regeneration speed for information per a track is determined by a relative speed between an optical head and an optical recording medium but does not exceed the relative speed.

As a solution of this problem, an optical information recording/regenerating apparatus of a multi-track regeneration type has been proposed. This apparatus irradiates regeneration light to multiple tracks simultaneously, has regeneration light-receiving elements in one-to-one correspondence with tracks, detects recorded pits in multiple tracks side by side simultaneously, and then regenerates information. For example, an apparatus disclosed in Japanese Patent Laid-Open No. 2-141932 samples binary-coded signals, which derive from pit detection signals acquired from tracks, using high frequencies, stores the binary-coded signals in memories associated with the tracks, and then reads the sampled binary-coded signals from the memories for regeneration.

This kind of optical information recording/regenerating apparatus of a multi-track regeneration type utilizes the advantage that reading the data of one track from a memory is much faster than actually scanning one track.

When a track to be regenerated is one of multiple tracks scanned previously, regeneration scanning need not be done but data is read from a memory to regenerate information. Compared with the single-track regeneration type, the multi-track regeneration type permits a higher executable regeneration speed.

However, Japanese Patent Laid-Open No. 2-141932 does not mention a track access method. That is to say, an effective track scanning method has not been discussed in terms of a track for which error correction has failed during information regeneration.

OBJECTS AND SUMMARY OF THE INVENTION

An object of the present invention is to provide an optical information recording/regenerating apparatus of a multi-track regeneration type. More particularly, this invention is concerned with an optical information recording/regenerating apparatus that proves effective even when information is regenerated from a plurality of simultaneously-scanned tracks and error correction fails for any track.

Another object of the present invention is to provide an effective track scanning method for an optical information recording/regenerating apparatus of a multi-track regeneration type. More particularly, this invention is concerned with a track scanning method that proves effective even when error correction fails for any of a plurality of simultaneously-scanned tracks during information regeneration.

Yet another object of the present invention is to provide an optical information recording/regenerating apparatus and a track scanning method for an optical information recording/regenerating apparatus that can regenerate information more accurately even when error correction fails for any of a plurality of tracks which have been scanned and regenerated simultaneously.

Still another object of the present invention is to provide an optical information recording/regenerating apparatus and a track scanning method for an optical information recording/regenerating apparatus that permits a higher executable regeneration speed than a single-track regeneration type apparatus when information is regenerated continuously from a plurality of tracks having adjacent or consecutive addresses.

An optical information recording/regenerating apparatus of the present invention includes an optical head for irradiating a regeneration light spot to multiple tracks on an optical recording medium, which has numerous tracks in which information is modulated and recorded with error-correcting codes appended, via an objective optical system, a driving means for driving the regeneration light spot and optical recording medium relatively to each other, and a regenerating means that scans multiple tracks to which the regeneration light spot has been irradiated by the optical head, and then reads various information from the multiple tracks.

The regenerating means in the optical information recording/regeneration apparatus comprises error-correcting means for performing error correction using the error-correcting codes for multiple tracks, error-correction result memory means for storing results indicating whether or not error correction has succeeded, and a control means that when the results stored in the error-correction result memory means indicate that error correction has not succeed for the information regenerated from at least one track among the information regenerated from the multiple simultaneously-scanned tracks, drives the driving means so that the track for which error correction has not succeeded will be included in a scanning range.

A track scanning method for an optical information recording/regenerating apparatus includes a procedure in which when information is regenerated one after another continuously from multiple adjacent tracks on an optical recording medium that has numerous tracks in which information is modulated and recorded with error-correcting codes appended, a regeneration light spot is irradiated to multiple tracks on the optical recording medium simultaneously in order to scan multiple tracks.

The track scanning method for an optical information recording/regenerating apparatus has an error-correction procedure in which error correction is performed on the information regenerated from multiple simultaneously-scanned tracks, a procedure in which it is determined whether or not error correction has succeeded during the error-correction procedure, and a procedure in which when it is determined in the determining procedure that error correction has not succeeded for the information regenerated from at least one track, tracks are re-scanned so as to include the track, for which error correction has not succeeded, in a scanning range.

Other features and advantages of the present invention will be apparent from the detailed description below.

BRIEF DESCRIPTION OF THE DRAWINGS

FIG. 7(a-c) shows waves provided by circuits shown in FIG. 6; and

FIG. 8 is an explanatory diagram for an access method for simultaneous regeneration of multiple tracks relating to the second embodiment.

DETAILED DESCRIPTION OF THE PREFERRED EMBODIMENTS

Embodiments of the present invention will be described in detail with reference to the drawings.

Figure 2:
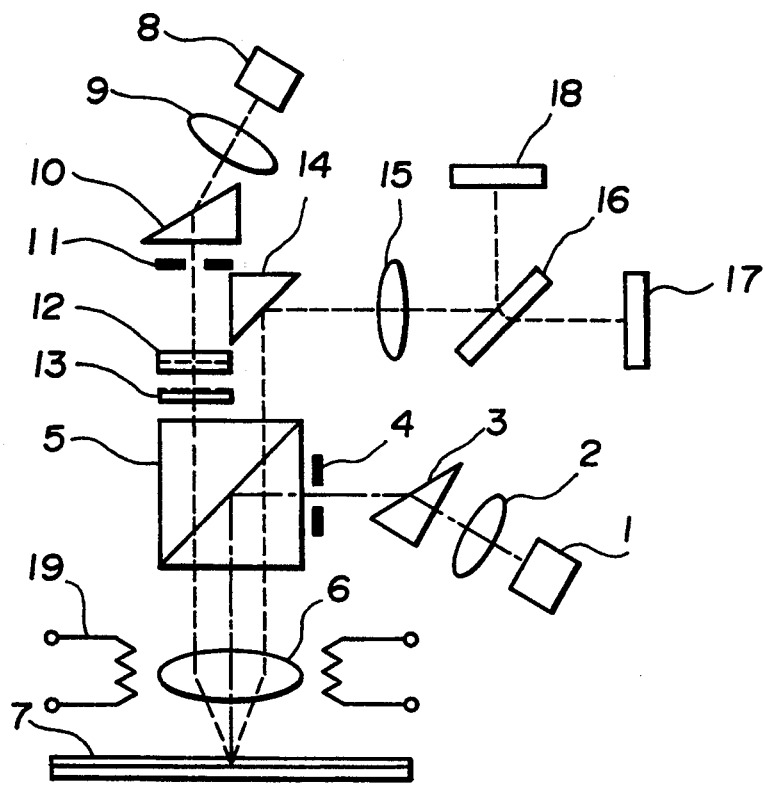
FIG. 2 shows components of an optical head.

FIG. 2 shows an optical system in an optical head incorporated in an optical information recording-/regenerating apparatus relating to the first embodiment of the present invention.

A regeneration light beam emitted from a semiconductor laser 8 serving as a light source passes through a collimation lens 9, a shaping prism 10, and a diaphragm 11, and becomes a circular beam of parallel rays whose diameter is reduced to be a specified value. When passing through a plano-concave cylindrical lens 12, the circular beam of parallel rays is refracted in one direction on a plane perpendicular to an optical axis of the plano-concave cylindrical lens 12. The circular beam of parallel rays then becomes slightly diffusive in that direction and enters a diffraction grating 13. The direction in which the beam is diffused by the cylindrical lens 12 is substantially perpendicular to the direction in which the beam is diffracted by the diffraction grating 13. The beam passing through the diffraction grating 13 is almost completely transmitted by a polarizing beam splitter 5, and converged onto an optical recording medium 7 (for example, an optical card) by an objective lens 6. The beam then provides a slit-type light beam spot that is enlarged in a direction in which the beam is diffused by the cylindrical lens 12.

Figure 3:
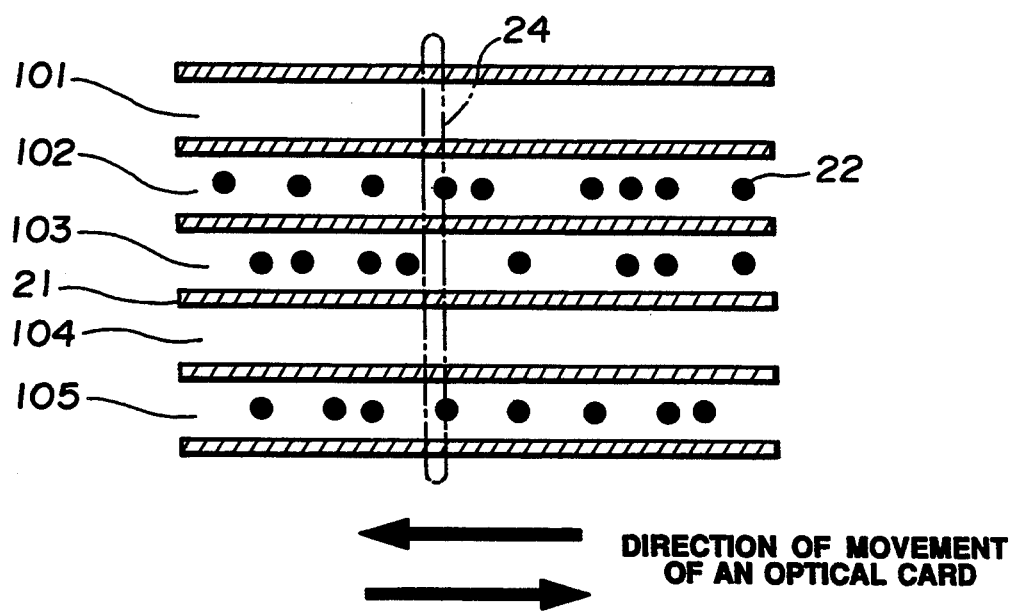
FIG. 3 is an explanatory diagram showing an imaged state of light spots on an optical card.

FIG. 3 shows a slit-type regeneration light spot 24 on an optical recording medium 7. The cylindrical lens 12 is designed to refract a beam in such a manner that the direction in which the slit-type regeneration light spot 24 is enlarged will be substantially perpendicular to track guides 21 on the optical recording medium. When the light spot 24 illuminates multiple tracks, information can be acquired from the multiple tracks on the optical recording medium 7 simultaneously. A range in which the light spot 24 illuminates is a scanning range.

The slit-type regeneration light spot 24 on the optical recording medium 7 is reflected regularly with the quantity of light modulated depending on the presence or absence of a track guide 21 and a pit 22. The reflected light goes back through the objective lens 6, and enters a polarizing beam splitter 5 as a beam of substantially parallel rays. The incident reflected light is almost completely transmitted by the polarizing beam splitter 5 because it is the regularly-reflected light. The reflected light then passes through a reflecting mirror 14, and enters a condenser 15. The light converged by the condenser 15 is divided by a half mirror 16. Divisions of the light are projected as an enlarged image of the light spot 24 on the optical recording medium onto the light-intercepting surfaces of a photodetector 17 and a focusing photodetector 18.

The objective lens 6 is driven by a tracking actuator 19 serving as a driving-means, and moves in a direction traversing tracks on the optical recording medium 7. In other words, the objective lens 6 jumps over tracks or performs a track jump.

Figure 6:
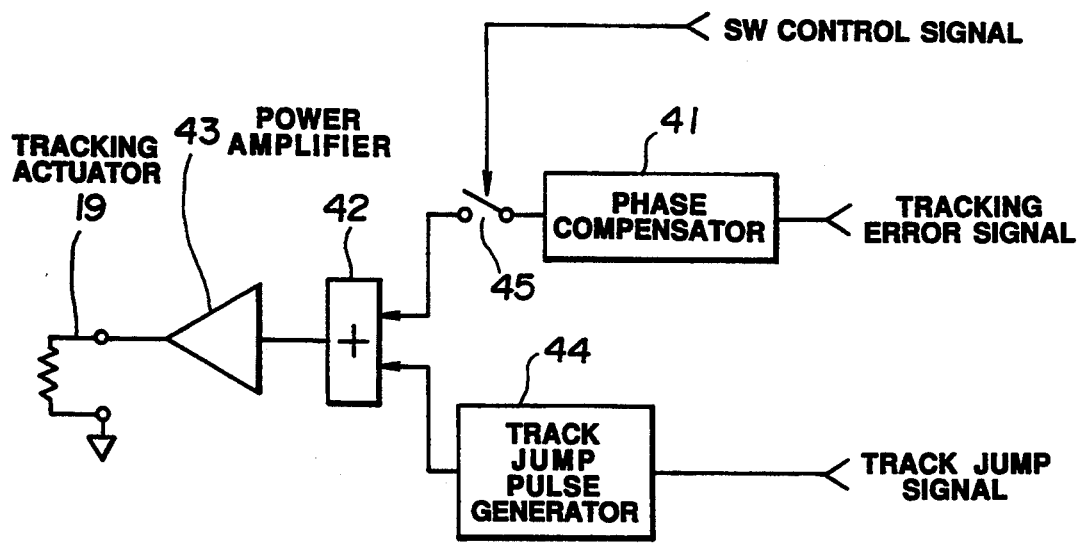
FIG. 6 shows components of a tracking actuator drive circuit.
Figure 6:
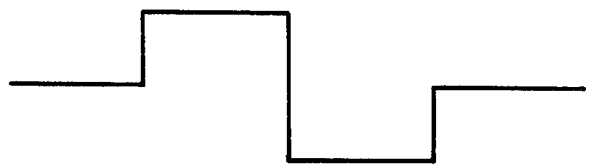
Figure 6:
Figure 6:

The objective lens 6, as shown in FIG. 6, is controlled with a tracking error signal passing through a phase compensator 41, an adder 42, a power amplifier 43, and a tracking actuator 19. The objective lens 6 is usually servo-controlled for tracking with the tracking error signal shown in FIG. 7b.

The track jump may be achieved by driving the optical head using a head actuator which is not shown. This is a known art, of which detailed description will therefore omitted.

The track jumping of the objective lens 6 is executed as described below. With the input of a track jump control signal, a track jump pulse generator 44 shown in FIG. 6 generates a track jump pulse shown in FIG. 7a. The track jump pulse is supplied to the tracking actuator 19 via the adder 42 and power amplifier 43, thus driving the objective lens 6. With a switch control signal shown in FIG. 7c, a switch 45 is turned off. The tracking error signal is therefore not yet fed to the actuator 19. In short, the objective lens 6 performs a track jump with the tracking error signal disconnected.

Figure 4:
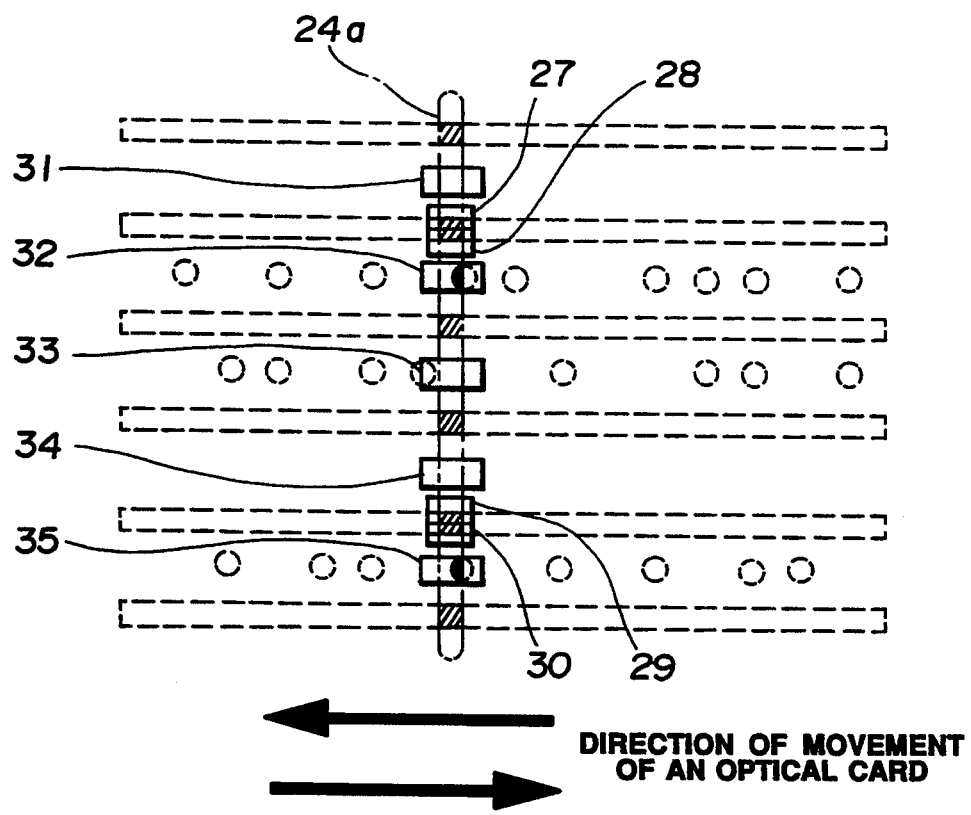
FIG. 4 is an explanatory diagram showing an optical image projected onto a photodetector.

FIG. 4 shows a spot image 24a of the slit-type regeneration light spot 24 projected onto the photodetector 17, regeneration light-receiving elements 31, 32, 33, 34, and 35, and tracking light-receiving elements 27, 28, 29, and 30.

The tracking error signal is produced by computing the outputs of the tracking light-receiving elements 27, 28, 29, and 30.

The optical recording medium 7 such as an optical card is transported by a driving means, which is not shown, along tracks. When the optical recording medium 7 is a disk, it is rotated by a spindle motor serving as a driving means.

Figure 5:
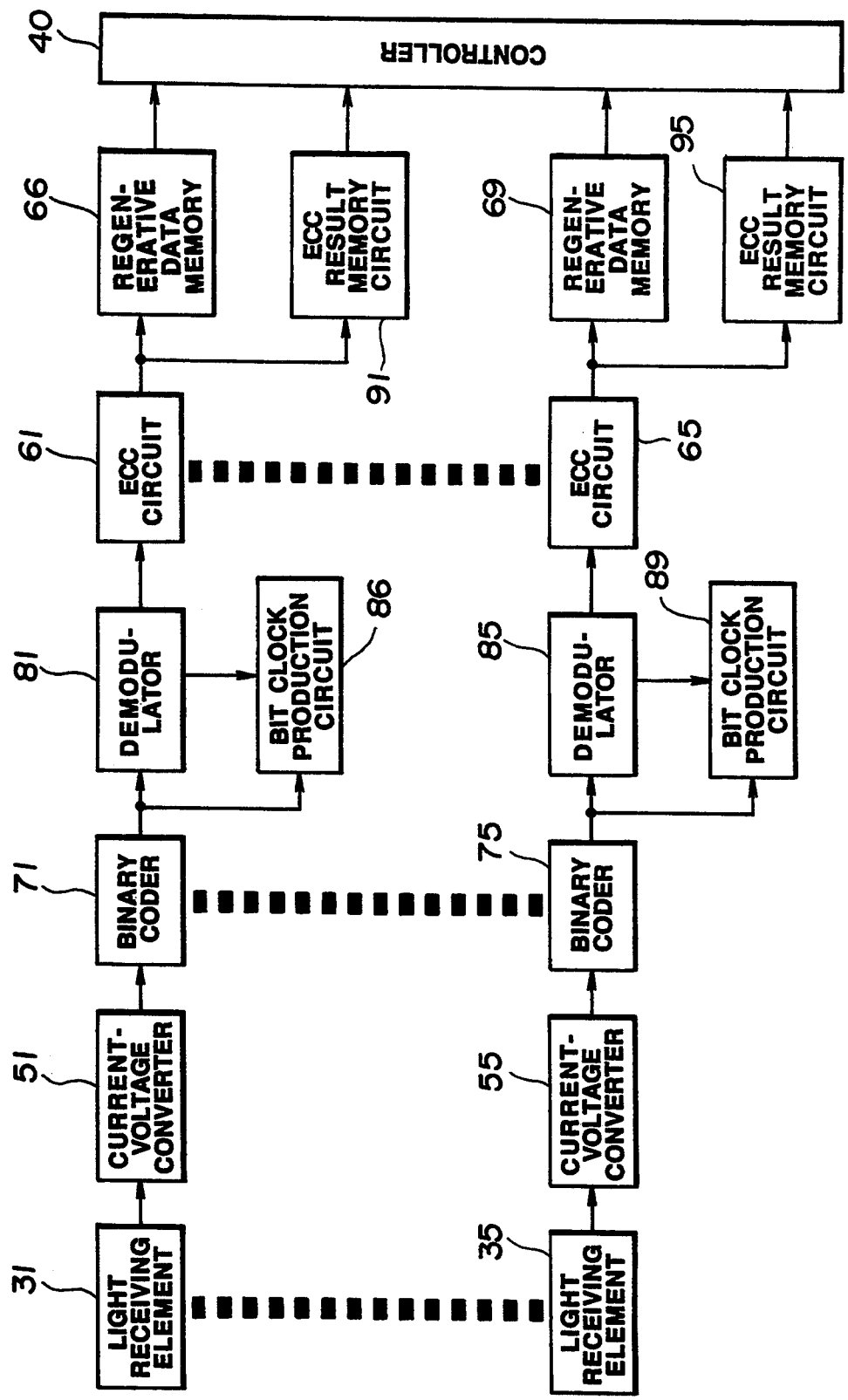
FIG. 5 is a block diagram of a regenerative signal processing circuit.

FIG. 5 is a block diagram of a signal processing circuit serving as a regenerating means for regenerating information on the basis of signals provided by the regeneration light-receiving elements in an optical information recording/regenerating apparatus relating to the present invention.

The current output of the regeneration light-receiving element 31 is converted into a voltage by a current-voltage converter 51, and supplied to a binary coder 71. A bit clock production circuit 86 produces a bit clock using the binary-coded output of the binary coder 71. Based on the bit clock and binary-coded output, a demodulator 81 demodulates the data that has been modulated and recorded. The demodulated data is fed to an error-correcting circuit 61 (hereinafter, ECC circuit). After undergoing error correction, the demodulated data is stored as original information in a regenerative data memory 66. In the meantime, the information indicating whether or not error correction has succeeded for the regenerated information; that is, a result of error correction is stored in an error-correction result memory circuit (hereinafter, ECC result memory circuit) 91.

This optical information recording/regenerating apparatus, as shown in FIG. 5, has multiple signal processing circuits (five circuits in FIG. 5) in association with the regeneration light-receiving elements 31, 32, 33, 34, and 35. Reference numeral 55 denotes a current-voltage converter. 75 denotes a binary coder. 89 denotes a bit clock production circuit. 85 denotes a demodulator. 65 denotes an ECC circuit. 69 denotes a regeneration data memory. 95 denotes an ECC result memory circuit. This system regenerates a signal provided by the regeneration light-receiving element 35. In FIG. 5, the circuits connected to the regeneration light-receiving elements 32, 33, and 34 are omitted.

According to the circuits shown in FIG. 5, when an optical recording medium makes a movement, five tracks are scanned side by side simultaneously. Recorded information is regenerated from the tracks and stored in regenerative data memories. In the meantime, the results of error correction are stored in the ECC result memory circuits.

A semiconductor memory can be employed as a regenerative data memory or an ECC result memory circuit. A controller 40 serving as a control means accesses ECC result memory circuits associated with tracks at a high speed, references the stored results to see if error correction has succeeded for the information regenerated from the tracks.

Next, an access method for an optical head to access an optical recording medium will be described with reference to FIG. 1.

Figure 1:
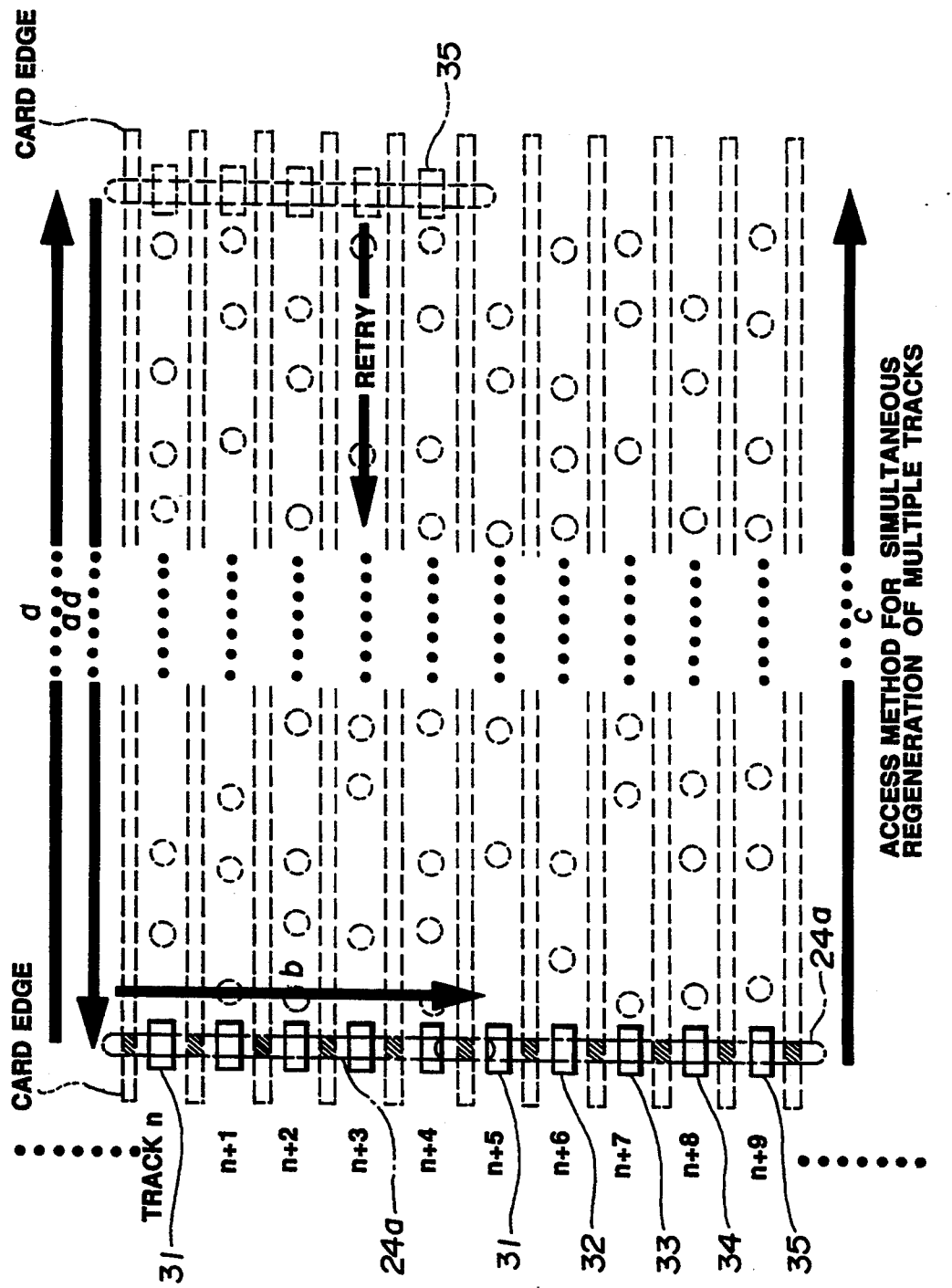
FIG. 1 is an explanatory diagram for an access method for simultaneous regeneration of multiple tracks relating to the first embodiment.

As shown in FIG. 1, a method for regenerating data continuously from tracks starting with a track n on an optical recording medium in a direction in which a track address ascends will be described as an example.

To begin with, an optical head moves in an arrow-a direction with respect to an optical recording medium. Five tracks of the track n to a track n+4 are then scanned simultaneously. Pits recorded in the five tracks are detected by the regeneration light-receiving elements 31, 32, 33, 34, and 35. The regeneration signal processing circuits shown in FIG. 5 regenerate the detected information; that is, the information recorded in the tracks.

If it is determined that error correction has not succeeded for the information, for example, in a track n+3, only the information in other tracks for which error correction has succeeded is transmitted to a host computer, which is not shown, via the controller 40.

However, since the information in the track n+3 has not been regenerated correctly, a track jump over five tracks is not carried out. The apparatus moves the optical head in an opposite direction; that is, an arrow-aa direction with respect to the optical recording medium. With the movement, the five tracks n, n+1, n+2, n+3, and n+4 are re-scanned. During the re-scanning, the apparatus performs regeneration retry on the track n+3.

In this embodiment, only when error correction does not succeed for the information regenerated from at least one track among the data read from multiple tracks side by side simultaneously, multiple tracks having the same addresses as those of previously-scanned tracks are re-scanned.

With the re-scanning, retry is executed for the track n+3 for which error correction has failed. If the retry succeeds in error correction, information is regenerated correctly. The controller 40 then transmits the regenerated information to the host computer, and allows the objective lens 6 (or optical head) to move perpendicularly to tracks as indicated with an arrow b or perform a track jump over five tracks. The apparatus then moves the objective lens 6 in an arrow-c direction with respect to the optical recording medium, thus scanning five new tracks of a track n+5 to a track n+9. During the retry, if the controller 40 is designed to read the correctly-regenerated information alone from the track n+3 but not to read information from the other tracks, unnecessary processing time will not be spent.

If the first re-scanning fails in regenerating correct information from the track n+3, the apparatus does not perform a track jump but re-moves the objective lens 6 in the arrow-a direction with respect to the optical recording medium. By scanning the five tracks of the track n to track n+4, the apparatus executes the second retry for the track n+3.

This apparatus repeats the above operations or repeatedly scans the same multiple tracks until correct information is regenerated from a track for which error correction has failed, thus improving reliability in information regeneration. Furthermore, since a track jump is performed in units of five tracks, the apparatus of this embodiment permits a higher information regeneration speed than an apparatus of a single-track regeneration type.

As described above, the apparatus of this embodiment includes circuits 91, etc., to 95 in which whether or not error correction has succeeded is stored in one-to-one correspondence with multiple tracks that can be scanned simultaneously. According to the apparatus and method of this embodiment, if error correction has failed for any of scanned tracks, a track jump is performed to scan the track for which error correction has failed. Retry is then executed for the track for which error correction has failed. More reliable information regeneration thus ensues.

If error correction has not failed for any of tracks, the apparatus of this embodiment performs a track jump in units of the number of simultaneously-readable tracks or a larger number of tracks, and then proceeds to the next scanning. The apparatus therefore permits a higher executable regeneration speed than a single-track regeneration-type apparatus, thus contributing to continuous regeneration of recorded information from multiple tracks of adjacent or consecutive addresses.

Next, referring to FIG. 8, an access method for accessing an optical recording medium relating to the second embodiment will be described. An access method for use in continuously regenerating data from tracks starting with a track n on the optical recording medium in a direction in which a track address ascends will be described as an example.

An apparatus employed in the second embodiment has the same configuration as that in the first embodiment. According to the method relating to this embodiment, an optical head is moved in an arrow-a direction with respect to an optical recording medium in order to scan five tracks of a track n to a track n+4. It is assumed that error correction has failed for the information in a track n+3.

Retry need not be done for the tracks n, n+1, and n+2. The optical head is therefore not moved over the five tracks. According to the method of this embodiment, the objective lens 6 is moved in an arrow-b' direction to perform a track jump over three tracks, so that the image of the track n+3 for which error correction has failed will be formed on the regeneration light-receiving element 31. The objective lens 6 then moves in an arrow-c' direction with respect to the optical recording medium, thus scanning five tracks of the track n+3 to a track n+7.

With the scanning, the apparatus (method) executes retry for the track n+3. At the same time, the apparatus can scan the tracks n+5, n+6, and n+7 for another information regeneration. In other words, only when error correction has fails for any of multiple simultaneously-scanned tracks, a track jump is performed in a direction, in which a track address ascends, so that a light spot will also scan the track. As for the track jump, the track n+3 is set at an outermost position so that a largest number of new tracks can be scanned.

Even if error correction has failed for multiple tracks, this apparatus (and method) sets the one of the multiple tracks, which is lying at an outermost location on the optical recording medium, at an outermost position within a scanning range, and performs a track jump to also scan all the tracks for which error correction has failed. A largest possible number of new tracks can thus be scanned. This embodiment permits a higher executable regeneration speed.

The apparatus (and method) then scans multiple subsequent tracks, whereby retry is executed for tracks for which error correction has failed. This embodiment thus improves reliability in information regeneration. During the retry, the controller 40 reads information only from the track n+3 for which error correction failed previously, and the new tracks n+5, n+6, and n+7; that is, from the tracks for which error correction has succeeded. Unnecessary processing time will therefore not be spent. Specifically, information is not read from the track n+4.

Furthermore, in this embodiment, the number of tracks subjected to a track jump is four at maximum, which depends on the location of a track for which error correction has failed, though. A higher executable regeneration speed than that in a single-track regeneration type can therefore be available. When error correction has succeeded for all tracks concerned, the operations identical to those in the first embodiment will be done.

The number of tracks illuminated with the regeneration light spot or the number of regeneration light-receiving elements is not restricted to the numerical value presented in this embodiment. The signal processing circuit is not restricted to the one illustrated, either. The ECC result memory circuit may be installed as a memory area within the regenerative data memory.

In the present invention, it will be apparent that a wide range of different embodiments can be constituted on the basis of the spirit of the invention. This invention is limited to the appended claims but not restricted to any specific embodiments.

What is claimed is:

1. An optical information recording/regenerating apparatus, comprising:
   an optical head for irradiating at least one regeneration light spot to a plurality of tracks on an optical recording medium, which includes numerous tracks in which information is modulated and recorded with error-correcting codes appended, simultaneously via an objective optical system;
   a driving means for driving said at least one regeneration light spot and said optical recording medium relatively to each other;
   a regenerating means for simultaneously scanning said plurality of tracks to which said optical head has irradiated said at least one regeneration light spot, and then reading recorded information from said plurality of tracks;
   error-correcting means receiving the recorded information read by said regenerating means, for performing error correction using said error-correcting codes for said plurality of tracks;
   error-correction result memory means for storing results that indicate whether or not said error-correcting means succeeded in error correction; and
   a control means responsive to results stored in said error-correction result memory means which indicate that error correction has not succeeded for the information regenerated from at least one track among the information regenerated from the plurality of simultaneously-scanned tracks, for controlling the drive of said driving means so that the track for which said error correction has not succeeded will be included in a scanning range, which scanning range is an area which consists of a plurality of simultaneously-scanned tracks.

2. An optical information recording/regenerating apparatus according to claim 1, wherein said control means controls the drive of said driving means so that said plurality of simultaneously-scanned tracks will be rescanned.

3. An optical information recording/regenerating apparatus according to claim 1, wherein said driving means drives at least either said objective optical system or said optical head in a direction substantially perpendicular to said tracks; and
   said control means controls said driving means so as to cause said at least one regeneration light spot to perform a track jump in such a way that said track for which error correction has not succeeded will be included in said scanning range.

4. An optical information recording/regenerating apparatus according to claim 3, wherein said regenerating means reads information from the track for which error correction has not succeeded.

5. An optical information recording/regenerating apparatus according to claim 3, wherein said control means controls said driving means so that when recorded information is regenerated one after another continuously from a plurality of adjacent tracks, if the results stored in said error-correction result memory means indicate that error correction has succeeded in all the information regenerated from said plurality of simultaneously-scanned tracks, a track jump of the number of tracks which can be scanned simultaneously will occur.

6. An optical information recording/regenerating apparatus according to claim 3, wherein said control means controls said driving means so as to cause said regeneration light spot to perform a track jump in such a way that said track for which error correction has not succeeded will be arranged at an outermost position in said scanning range.

7. An optical information recording/regenerating apparatus according to claim 3, wherein said control means controls said driving means so that when error correction has not succeeded for a plurality of tracks, a track jump will be performed so as to set the outermost track of said plurality of tracks for which error correction has not succeeded at an outermost position within said scanning range.

8. An optical information recording/regenerating apparatus according to claim 3, wherein said regenerating means reads information from the track for which error correction has not succeeded and new tracks included in said track scanning range.

9. A track scanning method for an optical information recording/regenerating apparatus, comprising:
   a procedure in which when recorded information is regenerated one after another continuously from a plurality of adjacent tracks on an optical recording medium that includes numerous tracks in which information is modulated and recorded with error-correcting codes appended, at least one regeneration light spot is irradiated to said plurality of tracks on said optical recording medium in order to scan said plurality of tracks simultaneously;
   an error-correcting procedure in which error correction is performed on information regenerated from said plurality of simultaneously-scanned tracks;
   a procedure for determining whether or not error correction has succeeded during said error-correcting procedure; and
   a procedure in which when it is determined in said determining procedure that error correction has not succeeded for the information regenerated from at least one track, tracks are rescanned so as to include at least the track for which error correction has not succeeded in the scanning range, which scanning range is an area which consists of a plurality of simultaneously-scanned tracks.

10. A track scanning method for an optical information recording/regenerating apparatus according to claim 9, wherein said procedure for re-scanning tracks is a procedure for re-scanning said plurality of tracks that have been simultaneously scanned in said reading procedure.

11. A track scanning method for an optical information recording/regenerating apparatus according to claim 9, wherein said procedure for re-scanning tracks includes a procedure in which when it is determined in said determining procedure that error correction has not succeeded, a track jump will be performed so as to include the track for which error correction has not succeeded in said scanning range.

12. A track scanning method for an optical information recording/regenerating apparatus according to claim 11, wherein said procedure for re-scanning tracks includes a procedure in which when it is determined in said determining procedure that error correction has not succeeded, a track jump will be performed so as to set said track for which error correction has not succeeded at an outermost position within said scanning range.

13. A track scanning method for an optical information recording/regenerating apparatus according to claim 11, wherein said procedure for re-scanning tracks includes a procedure in which when error correction has not succeeded for a plurality of tracks, a track jump will be performed so as to set the outermost track of said plurality of tracks for which error correction has not succeeded at an outermost position within said scanning range.

14. A track scanning method for an optical information recording/regenerating apparatus according to claim 9, further including a procedure in which when it is determined in said determining procedure that error correction has succeeded in all the information regenerated from said plurality of simultaneously-scanned tracks, a track jump of the number of tracks which can be scanned simultaneously will occur.

* * * * *